April 12, 1960     T. E. RASSIEUR     2,932,293
FOOD STEAMER
Filed Jan. 7, 1959

INVENTOR:
THEODORE E. RASSIEUR
By Sutherland, Polster & Taylor
ATTORNEYS.

2,932,293

FOOD STEAMER

Theodore E. Rassieur, University City, Mo., assignor to Central Mine Equipment Company, St. Louis, Mo., a corporation of Missouri Application January 7, 1959, Serial No. 785,429

3 Claims. (Cl. 126—369)

This invention concerns cooking utensils, and more particularly food steamers. It has been proposed for quite some time to cook vegetables and other foods by suspending them in a vessel containing water in such a manner that they are not directly in contact with the water, but are bathed by the steam given off by the water when the water is brought to boil. The steamer of my invention is a device for accomplishing this purpose in a simple, more economical and more convenient way than was heretofore possible.

All the steamers of the prior art of which I am aware were quite deep compared to their diameter, and hence have had the disadvantage of requiring a specially built vessel for containing the water, the depth and diameter of this special vessel being determined by the depth and size of the food containing vessel. My invention overcomes this difficulty by providing a shallow dish-like steaming plate onto which the food to be steamed can be laid much in the same manner as it would be on an ordinary dish. In addition, my steamer has a wide inclined flange around the rim thereof, so that it can readily adapt itself to any number of water containing vessels, regardless of whether they are deep or shallow, wide or narrow, large or small. The steamer of my invention can be used both with a sauce pan and with a skillet, depending on whichever is available.

It is therefore the object of my invention to provide a food steamer which is simple, efficient and adapted to be used with any kind of water containing vessel normally available in a kitchen.

Figure 1:
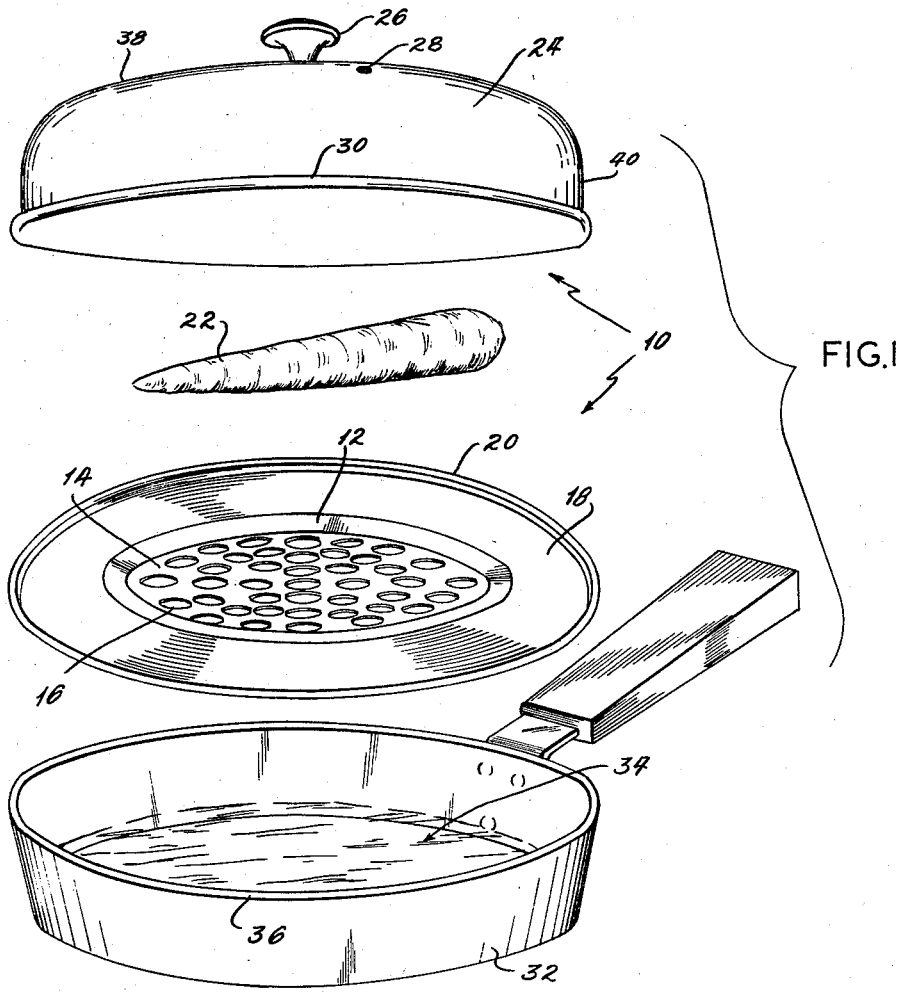
Figure 2:
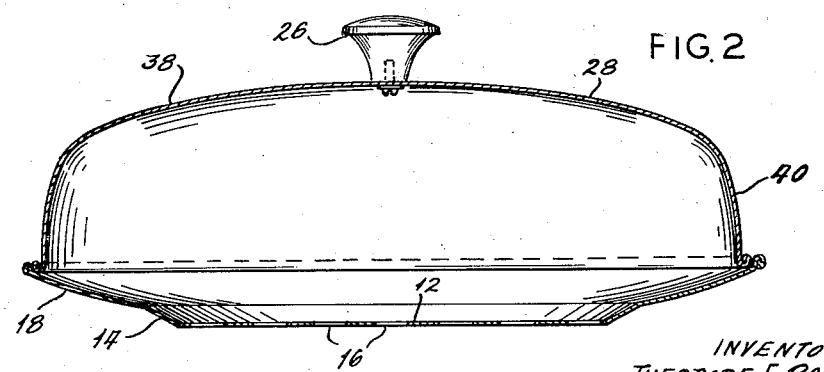

Other features of my invention will readily appear from the following description taken in connection with the accompanying drawings in which:

Figure 1 is an exploded view showing the utensil of my invention used in connection with an ordinary skillet; and Figure 2 is a vertical section through a steamer constructed in accordance with my invention.

Basically, the steamer of my invention consists of a shallow metal, ceramic or plastic dish having a central depressed portion which is perforated with a multiplicity of comparatively large apertures. A wide inclined flange extends around the rim of this central portion, the flange being designed to rest on the rim of any appropriate water containing vessel. A cover is provided for covering the dish so as to form a chamber retaining a sufficient amount of steam to envelop on all sides the food placed on the dish. The rim of the cover and the outer edge of the flange of the dish are rolled so as to facilitate centering and prevent accidental shifting of the cover with respect to the dish. At the same time, the rolling of the edges provides a better seal for retaining the steam underneath the cover. The cover is equipped with a vent opening so as to allow sufficient steam to escape to prevent the building up of pressure inside the utensil, and to prevent the formation of a vacuum when the water cools down following the end of the cooking process.

Referring now to Figure 1, the steamer of my invention is generally shown at 10. The steamer comprises a shallow dish 12 having a flat depressed bottom portion 14 having numerous large openings 16. Outwardly of the rim of the portion 14, an inclined flange 18 is formed integrally with the portion 14. The outer edge of flange 18 is rolled as shown at 20. The food article 22 is placed on the depressed portion 14 in order to be cooked. A cover 24 having a lifting knob 26 and a vent opening 28 is placed on top of the dish 12. The rolled rim 30 of cover 24 is of a diameter just slightly smaller than the diameter of rolled edge 20 of dish 12. In order to provide the steam, an ordinary skillet 32 may be partly filled with water 34. The dish 12 is then set onto the skillet 32 so that flange 18 comes to rest on rim 36 of skillet 32. In view of the fact that the flange 18 is inclined, the steamer will readily center itself over the skillet 32. The openings 16 are comparatively large (their diameter being on the order of one-half inch or more) in order to avoid clogging of the openings by food particles and to allow free circulation of the steam throughout the water containing vessel and steamer. Condensation water will collect on the inclined top portion 38 of cover 24 and will run down to the sides 40 of cover 24, from where it will run onto the flange 18 and back into the water container vessel through the outermost ones of openings 16, thus staying away from the food and preventing the food from getting soggy. Inasmuch as the condensation water does not come in contact with the food, the juices and flavor of the food will not be washed away, but will be retained in the food itself.

It will be seen that I have provided a simple, cheap, efficient vegetable steamer which can be used with any available water containing vessel likely to be found in a kitchen. Obviously, many different embodiments of this invention are possible, and the embodiment shown is intended to be an illustration only. I therefore do not desire to be limited except by the scope of the following claims.

Having thus described the invention, what is claimed and desired to be secured by Letters Patent is:

1. A food steamer of the type adapted to operate at atmospheric pressures comprising, a shallow dish-like steaming plate, a centrally arranged depressed perforate portion with an outwardly and upwardly inclined edge in said plate upon which the food to be steamed is supported in the same manner as on an ordinary dish, a wide flange surrounding said centrally arranged perforate portion at said edge and extending outwardly thereof, a rim at the periphery of said flange, said flange having an under surface inclined gradually upwardly and outwardly to said rim to form a stable seat with the rim of cooking pans of various rim diameters, and to facilitate centering of said steaming plate with respect to the rim of the cooking pan so that said dish will assume a near level position on the cooking pan, and a vented dome-like cover having an outer depending rim seated on said steaming plate at the rim thereof.

2. A steamer as defined in claim 1 in which said plate has a rolled rim, and said cover has a rolled rim fitting within the rolled rim of said plate.

3. A steamer as defined in claim 1, in which the width of said flange surrounding said centrally arranged perforate portion is at least half the inner radius of the flange so as to cover cooking pans within a certain range of rim diameters, and in which said plate has a rolled rim, and said cover has a rolled rim fitting within the rolled rim of said plate.

References Cited in the file of this patent

UNITED STATES PATENTS

| 157,897 | Welch | Dec. 15, 1874 |
| 639,473 | Ward | Dec. 19, 1899 |
| 1,485,292 | Popper | Feb. 26, 1924 |
| 1,651,442 | Caskin | Dec. 6, 1927 |
| 2,469,778 | Morici | May 10, 1949 |
| 2,742,850 | Fond | Apr. 24, 1956 |